(12) United States Patent
Katz et al.

(10) Patent No.: US 8,374,751 B2
(45) Date of Patent: Feb. 12, 2013

(54) AUTOMOTIVE IMPACT SENSING SYSTEM

(75) Inventors: Beverly M. Katz, Livonia, MI (US); Michael W. Sulkowski, Commerce Township, MI (US); Stephen Greene, Ann Arbor, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 852 days.

(21) Appl. No.: 12/134,244

(22) Filed: Jun. 6, 2008

(65) Prior Publication Data

US 2009/0306857 A1 Dec. 10, 2009

(51) Int. Cl.
*B60R 21/0136* (2006.01)
(52) U.S. Cl. ............ 701/45; 280/735; 180/274
(58) Field of Classification Search ........... 280/734, 280/735; 180/274; 701/45, 46, 47; 340/436, 340/437; 296/187.04; *B60R 21/0136*
See application file for complete search history.

(56) References Cited

U.S. PATENT DOCUMENTS

| | | | |
|---|---|---|---|
| 3,853,199 A | 12/1974 | Hirashima et al. | |
| 3,859,482 A * | 1/1975 | Matsui et al. | 200/61.08 |
| 4,176,858 A * | 12/1979 | Kornhauser | 280/734 |
| 4,995,639 A | 2/1991 | Breed | |
| 5,441,301 A | 8/1995 | Breed et al. | |
| 5,629,681 A | 5/1997 | DuVall et al. | |
| 5,793,005 A | 8/1998 | Kato | |
| 6,009,970 A | 1/2000 | Breed | |
| 6,182,514 B1 | 2/2001 | Hodges | |
| 6,206,129 B1 | 3/2001 | Breed et al. | |
| 6,234,519 B1 | 5/2001 | Breed | |
| 6,371,515 B1 | 4/2002 | Fujishima et al. | |
| 6,557,889 B2 | 5/2003 | Breed | |
| 6,561,301 B1 * | 5/2003 | Hattori et al. | 180/274 |
| 6,678,599 B2 | 1/2004 | Eisele et al. | |
| 6,882,914 B2 | 4/2005 | Gioutsos et al. | |
| 7,207,410 B2 | 4/2007 | Song et al. | |
| 7,236,866 B2 * | 6/2007 | Takafuji et al. | 701/45 |
| 7,353,087 B2 * | 4/2008 | Takafuji et al. | 701/1 |
| 7,395,896 B2 * | 7/2008 | Gerlach et al. | 180/274 |
| 7,525,416 B2 * | 4/2009 | Mader | 340/436 |
| 7,635,042 B2 * | 12/2009 | Mader | 180/274 |
| 7,637,545 B2 * | 12/2009 | Takahashi et al. | 293/132 |
| 7,782,180 B2 * | 8/2010 | Takafuji | 340/436 |

(Continued)

FOREIGN PATENT DOCUMENTS

DE 102007014671 A1 * 10/2007
DE 102007041786 A1 * 4/2008

(Continued)

*Primary Examiner* — Ruth Ilan
*Assistant Examiner* — Keith Frisby
(74) *Attorney, Agent, or Firm* — Ralph E. Smith (57) ABSTRACT

A motor vehicle impact sensing system for a vehicle that includes a controller that is connected to a pressure sensor that cooperates with a discrete deformable vessel. The pressure sensor is operatively positioned relative to the deformable vessel such that changes in the vessel generate a signal indicative of a pressure change. The signal associated with the pressure change is communicated from the pressure sensor to the controller. If the signal exceeds a threshold, such as where there is a rapid pressure increase in the vessel, the controller initiates one or more safety measures, such as deploying airbags or the like, to reduce the effects of an undesired impact. The deformable vessel and pressure sensor form a sensor assembly that can be located in one or more of various locations throughout the vehicle including its front end, its doors, quarter panels, side panels, and/or its rear end.

17 Claims, 5 Drawing Sheets

U.S. PATENT DOCUMENTS

| | | | |
|---|---|---|---|
| 7,806,222 B2 * | 10/2010 | Takahashi et al. | 180/274 |
| 8,049,287 B2 * | 11/2011 | Combi et al. | 257/416 |
| 2002/0013648 A1 | 1/2002 | Feser et al. | |
| 2004/0243294 A1 | 12/2004 | Miyata et al. | |
| 2005/0269809 A1 | 12/2005 | Gaukel et al. | |
| 2006/0087417 A1 * | 4/2006 | Kiribayashi | 340/435 |
| 2007/0181359 A1 * | 8/2007 | Mader | 180/274 |

FOREIGN PATENT DOCUMENTS

| | | |
|---|---|---|
| EP | 1 401 682 B1 | 3/2004 |
| GB | 2148207 A * | 5/1985 |
| WO | WO 95/02439 | 9/1995 |
| WO | WO 03/082639 A1 * | 10/2003 |

* cited by examiner

AUTOMOTIVE IMPACT SENSING SYSTEM

FIELD OF THE INVENTION

The present invention relates to impact sensing in a motor vehicle, and more particularly to an apparatus and method for differentiating between incidental or non-consequential impact events and impact events that require deployment of safety measures.

BACKGROUND OF THE INVENTION

Automotive impacts, whether incidental, accidental, or otherwise unintentional, are unfortunately all too commonplace. Impacts can occur at virtually any vehicle speed. Low speed impacts or contacts, common during parking activities, are often anticipated by an operator or driver and generally occur at such low speeds that safety measures, such as the deployment of air bags, are unnecessary. Higher speed impacts, such as those that occur at travel speeds, typically require safety measures, such as deployment of one or more airbags, to help protect the occupants of the vehicle. Understandably, the faster such impact events can be detected and confirmed at higher speed vehicle operation, the quicker safety measures can be deployed.

To this end, manufacturers determine the initiation of an impact event using an impact sensing system that includes one or more accelerometers located within the motor vehicle that communicate with a control module, e.g. airbag control module, that controls safety measure, e.g. airbag deployment. Each accelerometer senses changes in acceleration of the motor vehicle along its sensing axis. While such devices work well in some aspects, systems employing a single accelerometer within the crush zone have given way to more sophisticated detection arrangements that include more than one accelerometer sensor and which can employ multi-axis accelerometers to enhance the detection of offset impacts, or impacts occurring to a front corner of the motor vehicle or otherwise occurring off the axis of the accelerometer. Still other systems have improved upon these impact detection arrangements by increasing the number of accelerometers located within a frontal vehicle crush zone, or the forward bumper area of the motor vehicle. Although increasing the number of accelerometers has increased the responsiveness of the impact sensing system, these systems are not without their respective drawbacks.

Figure 7:
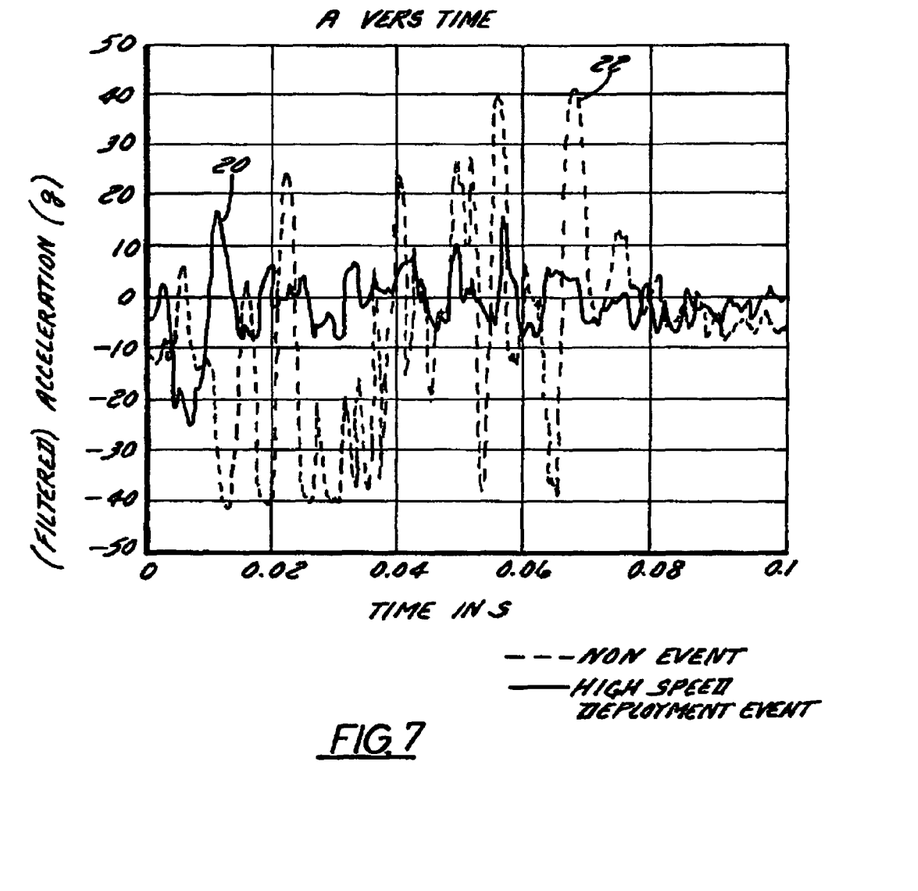
FIG. 7 is a graphical representation comparing acceleration signals for a rough road event and a high speed impact event.
Figure 8:
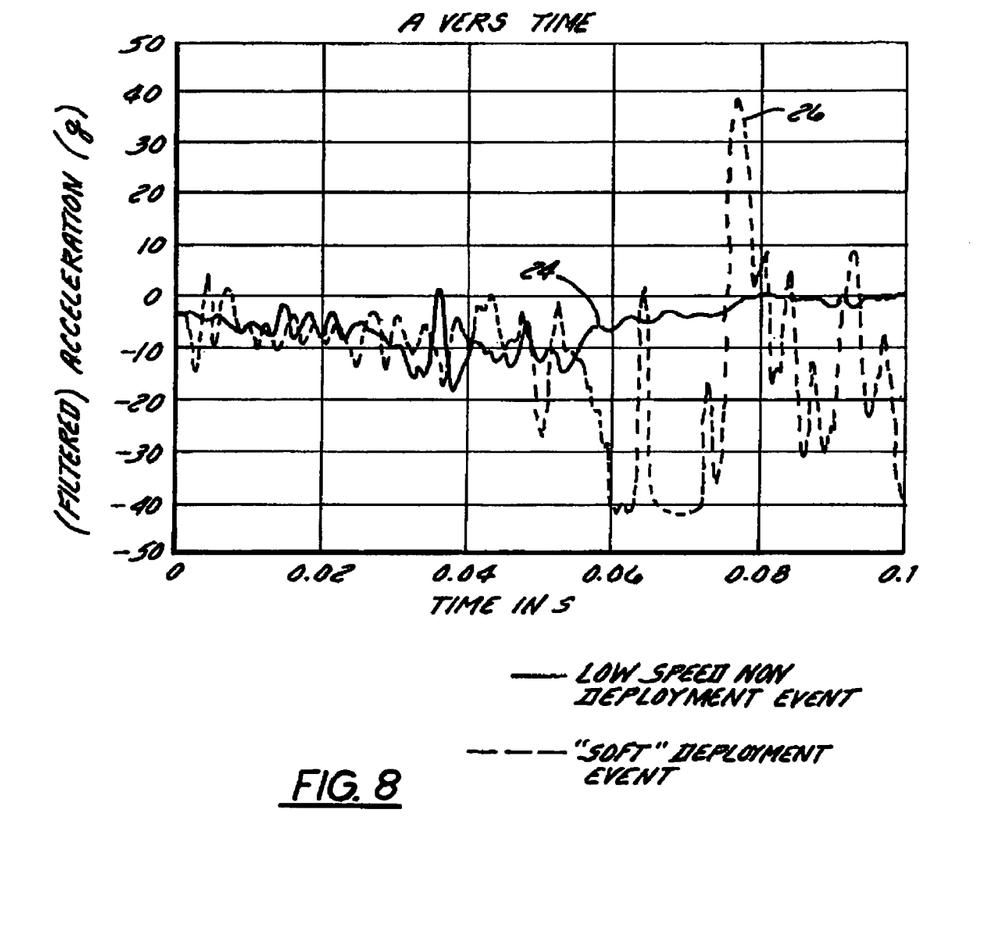
FIG. 8 is a graphical representation comparing acceleration signals for a low-speed event that would not require safety measure deployment to a high speed offset or angular impact event during which it is desirable to deploy safety measures.

Multiple accelerometer arrangements tend to be inconsistent between test crashes and are therefore difficult to calibrate. In addition, vehicle crush in the vicinity of an accelerometer during a crash can rotate the accelerometer such that its axis along which sensing is optimal is disposed at an angle relative to subsequently transmitted crushing force thereby reducing the accuracy of its signal output. Moreover, during a washout event, or an event during which the sensor system is subjected to non-impact vehicle suspension motion, such as driving over a pothole or the like, a delay of usually up to 15 milliseconds must be built into the system to determine if the system is detecting an impact event that would require deployment of a safety measure or whether a suspension-related impact, such as driving over a pothole or the like, has occurred. As a result, great efforts have been made to reduce the time needed to distinguish between major impact events that require deployment of safety measures and events more commonly associated with non-impact suspension motion or minor impact events that would not otherwise benefit from the deployment of a safety measure. FIGS. 7 and 8 graphically represent the detection signals associated with impact and non-impact events and evidence the difficulty associated with distinguishing impacts requiring safety measure deployment from inconsequential impacts.

As shown in FIG. 7, the impact sensing system of a vehicle traversing a rough road can generate an acceleration signal 20 that mimics the early stage acceleration signals 22 associated with a high-speed impact event. FIG. 8 similarly shows how an acceleration signal 24 produced during a low speed event, or an event where safety measures are unnecessary, can mimic an acceleration signal 26 produced during a high speed impact event, such as an offset or angular impact where deployment of safety measures would be desired. Notably, signals 24, 26 are nearly indistinguishable for the initial 0.05 seconds of the event. Understandably, the sooner the type of event can be accurately identified with confidence, the sooner safety measures can be deployed when necessary.

One attempt to provide a system that more readily distinguishes between types of impact events includes the system disclosed in applicants issued U.S. Pat. No. 7,207,410 titled "Apparatus and Method for Enhanced Impact Sensing", the disclosure of which is incorporated herein. The impact sensing system disclosed therein includes at least one switch located at the tip of a frame rail in a vehicle crush zone that is associated with an acceleration sensor. The switch and sensor are operatively associated with a control module or controller to initiate safety measures upon confirmation of an impact event versus a non-impact event or an event otherwise not significant enough to require safety measure deployment. The controller alters a threshold associated with deployment of the safety measures in conjunction with assessment of a switch position to allow deployment of safety measures even though a threshold value associated with the accelerometer may not be satisfied. Although such a system provides a robust impact sensing and confirmation paradigm, it is desired to even further increase the expediency with which an impact can be detected and assessed for determining if a detected event requires deployment of safety measures, e.g. airbag deployment.

Therefore, there is a need for an automotive impact sensing system that can both quickly detect impacts and quickly differentiate between types of impact events.

BRIEF DESCRIPTION OF THE INVENTION

The present invention provides an automotive impact sensing apparatus for an automotive impact sensing system and automotive impact sensing system that overcomes one or more of the aforementioned drawbacks. The sensing apparatus includes a pressure sensor operatively connected with a discrete deformable pressure vessel that is controllably vented and mountable to various areas of the vehicle including vehicle frame rails in a front crush zone of the vehicle. The impact sensing system includes a controller linked to the pressure sensor as well as to one or more crash sensors, e.g., accelerometers, such that a rapid rise in pressure in the vessel during an impact can cause the controller to deploy safety measures or to reduce a threshold with regard to the other crash sensors used to trigger deployment.

In a first preferred embodiment, the impact sensing system includes a plurality of impact sensing apparatuses with one impact sensing apparatus mounted to a portion of the vehicle in a front crush zone and another impact sensing apparatus mounted to another portion of the vehicle. Each impact sensing apparatus includes a pressure sensor capable of sensing or detecting a relatively rapid rise in pressure in the deformable pressure vessel indicative of a low speed crash where safety measure deployment is desired as opposed to a softer impact or suspension motion not necessitating deployment.

In one embodiment, the vessel is made a deformable material. In one embodiment, a vessel is discrete, formed of a moldable material, and constructed having one or more vents whose size and configuration can be varied to tune pressure characteristics of the volume of atmosphere within the vessel during an impact event that causes deformation of the crush zone. The pressure sensor is a conventional high speed pressure sensor capable of sensing rapid pressure increases within the volume of the vessel within a typical crash time frame of three to five milliseconds characteristic of a vehicle impact tending to necessitate deployment of safety measures.

In a second preferred embodiment, the impact sensing system includes an impact sensing apparatus having a deformable vessel that encloses a volume and that is secured to a first portion of the motor vehicle. The deformable vessel is positioned adjacent a second portion of the motor vehicle such that relative motion between the first and second portions of the motor vehicle deforms the vessel. A pressure sensor, such as a high speed pressure sensor, is operatively connected to the deformable vessel. A controller is configured to receive a signal from the pressure sensor and determine a change in position of the first portion of the motor vehicle relative to the second portion of the motor vehicle based on a rapid change of a pressure in the deformable vessel over a relatively short period of time.

One aspect of the invention useable with the above impact sensing system and apparatus includes deploying one or more safety measures as a function of, at least in part, relatively rapid pressure changes in the deformable vessel. Safety measures associated with one of more of the aspects of the present invention include airbag deployment, engine and/or drive train control, and/or interaction, altering suspension and/or steering performance, and interaction with occupant restraint operation.

Another aspect of the invention useable with one or more of the above aspects includes configuring the controller to differentiate between impact events that require the deployment of safety measures and other events that do not. The controller is further configured to control operation of the safety measures based on this determination. Another aspect of the invention includes providing vessel pressure change information to the controller as a result of deformation in the crush zone to enhance the safety measure determination and performance.

Another feature of one or more of the above aspects includes providing the deformable vessel in a replaceable modality such as with retention clips, a snap arrangement, or the like. Preferably, the pressure sensor includes a digital bus or connection for or to such a bus to provide a pressure sensor system that can be easily used with multiple vehicle product platforms.

A further aspect of the present invention which is associated with one or more of the above aspects includes a method for assessing automotive impact events. The method causes a signal to be generated that is associated with a rapid change in pressure in a vessel proximate an area of interest of an automobile. The signal is then communicated to a controller which deploys one or more safety measures if a desired value or threshold is exceeded. In a further aspect of the invention, a signal from the pressure sensor that is indicative of a rapid rise in pressure in the deformable vessel causes the controller to lower the threshold at which signals or data from one or more other sensors, such as other crash or impact sensors, may allow safety measure deployment.

Another aspect related to one or more of the above aspects include the ability of the controller module to disregard sensed pressure changes associated with impact events if no safety measures are available which would reduce detrimental effects associated with the impact.

It is appreciated that the aspects and features of the invention summarized above are not limited to any one particular embodiment of the invention. That is, many or all of the aspects above may be achieved with any particular embodiment of the invention. Those skilled in the art will appreciate that the invention may be embodied in a manner preferential to one aspect or group of aspects and advantages as taught herein. These and various other aspects, features, and advantages of the present invention will be made apparent from the following detailed description and the drawings.

BRIEF DESCRIPTION OF THE DRAWINGS

The drawings illustrate preferred embodiments presently contemplated for carrying out the invention.

DETAILED DESCRIPTION OF AT LEAST ONE PREFERRED EMBODIMENT

The following description of each preferred embodiment is merely exemplary in nature and is in no way intended to limit the invention, its application, or uses.

Figure 1:
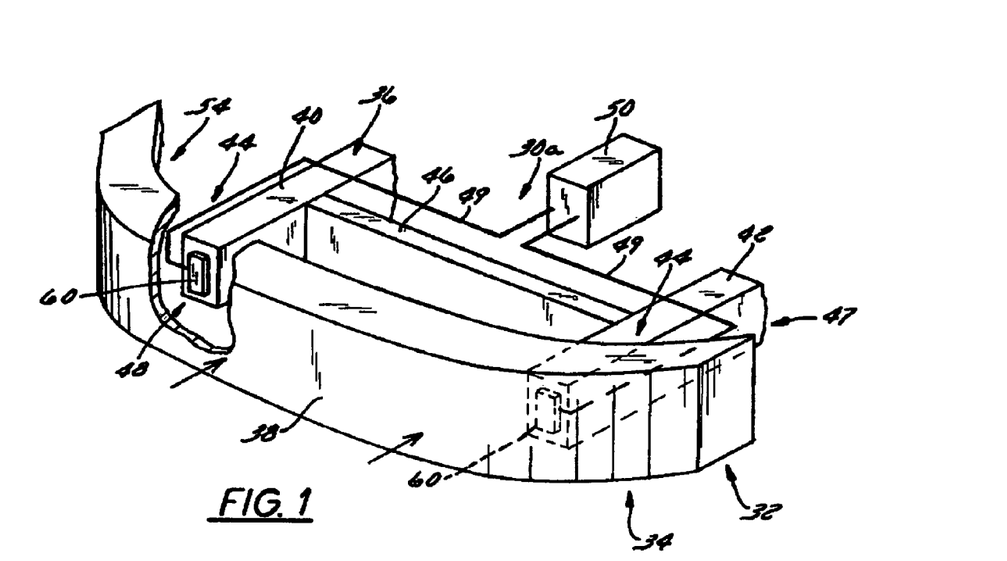
FIG. 1 is a perspective fragmentary view of a portion of the front end of an exemplary motor vehicle having a first embodiment of an impact sensing system according to the present invention.
Figure 2:
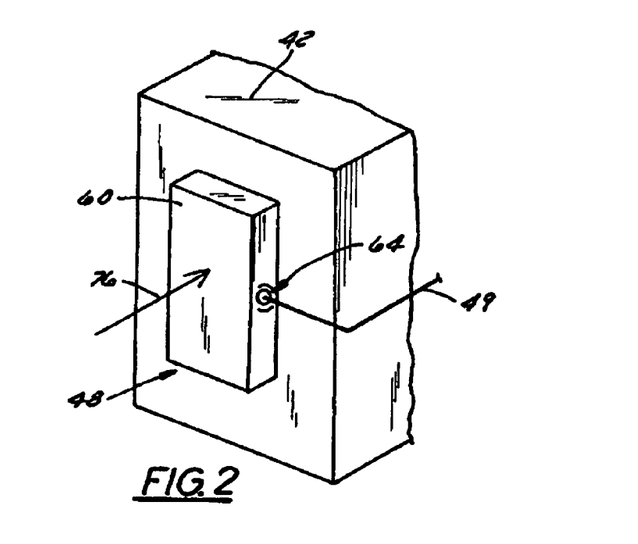
FIG. 2 is an enlarged perspective view of the impact sensor assembly used in the impact sensing system of FIG. 1.

FIGS. 1 and 2 illustrate a first preferred embodiment of an impact sensing system 30a in accordance with the present invention that is incorporated into a front end 32 of a motor vehicle 34. Although not shown, the vehicle 34 also includes front wheels, an engine, motor, or other prime mover, a driver seat, a passenger seat, a steering wheel, and rear wheels. Such a vehicle can also include a transmission, rear storage compartment, e.g., trunk and the like.

Motor vehicle 34 generally includes a first portion or frame 36 and a second portion or bumper 38. Frame 36 generally includes one or more frame rails 40, 42 that extend lengthwise relative to vehicle 34. Bumper 38 typically is mounted to a front portion 44 of each frame rail 40, 42 by a bracket (not shown). Frame 36 includes one or more cross members 46 that extend generally parallel to bumper 38 between frame rails 40, 42 to enhance the lateral rigidity of frame 36. This frontal region, extending from the bumper 38 and at least part of each frame rail 40, 42, define at least part of a crush zone 47 of known construction designed to substantially deform during an impact without significant resistance to the impact in a manner that facilitates impact detection by impact sensing system 30a.

The impact sensing system 30a includes one or more deformable vessel pressure sensor assemblies 48 disposed in a crush zone 47 of the vehicle 34 with each sensor assembly 48 linked by a digital bus 49 with a control module or controller 50 configured to assess signals received from each sensor assembly 48 during an impact event. The controller 50 includes a processor (not shown), such as a microcontroller, along with various other electrical components and is configured, such as via firmware or the like, to make safety measure deployment decisions based at least in part on signals received from one or more of the sensor assemblies 48. The controller 50 also receives signals from at least one accelerometer (not shown) that can be onboard the controller 50 or located in a central location within the vehicle 34 used by the controller 50 in making safety measure, e.g., airbag, deployment decisions. More than one centrally located accelerometer can be used. For example, in one known implementation, two such centrally located accelerometers are employed and can be arranged in a known out-of-phase configuration to facilitate safety measure deployment decision making by the controller 50.

As is shown in FIGS. 1 and 2, each deformable vessel pressure sensor assembly 48 is located between one portion of the vehicle frame 36 and another portion in crush zone 47. For example, in the arrangement shown in FIGS. 1 and 2, each sensor assembly 48 is mounted to a front tip or end of a frame rail 40, 42 such that it is located generally behind bumper 38 so as to enable detection of rapid pressure changes due to crush zone deformation in the region of the bumper 38 and frame rails 40, 42 that can occur during a crash. If desired, it is appreciated that sensor assemblies 48 can be supported by bumper 38 and oriented to be positioned proximate a portion frame 36 in the crush zone 47. It is envisioned that each sensor assembly 48 is disposed within the crush zone so as to be able to detect relatively small magnitudes of deformation or crush of bumper 38 relative to frame 36.

While each deformable vessel pressure sensor assembly 48 is shown in FIG. 1 oriented with its bus cabling 49 extending in an outboard direction relative to frame rails 40, 42, the sensor assembly 48 can be oriented in another manner. While each sensor assembly 48 has a generally rectangular shape, it can be configured in different shapes, such as spherical, annular, square, or the like. It is contemplated that one or more sensor assemblies 48 can be formed or shaped in a manner so as to conform to a desired space or to facilitate mounting to a vehicle component in the crush zone 47.

Although two deformable vessel pressure sensor assemblies 48 are shown in FIG. 1, it should be appreciated that more than two such sensor assemblies 48 can be used. It should further be appreciated that each sensor assembly 48 may be mounted to or otherwise cooperate with the frame rail 40, 42 to which it is mounted and/or the frame 36 in any number of ways including by a snap-fit connection, a fastener supported connection, e.g., a hook and loop fastener arrangement, a plug-in arrangement, a cooperating geometric association or the like. If desired, each sensor assembly 48 may be mounted to some other part of the vehicle 34 or its frame 36 in a manner that enables it to be positioned between the end of a corresponding frame rail 40, 42 and bumper 38.

Figure 3:
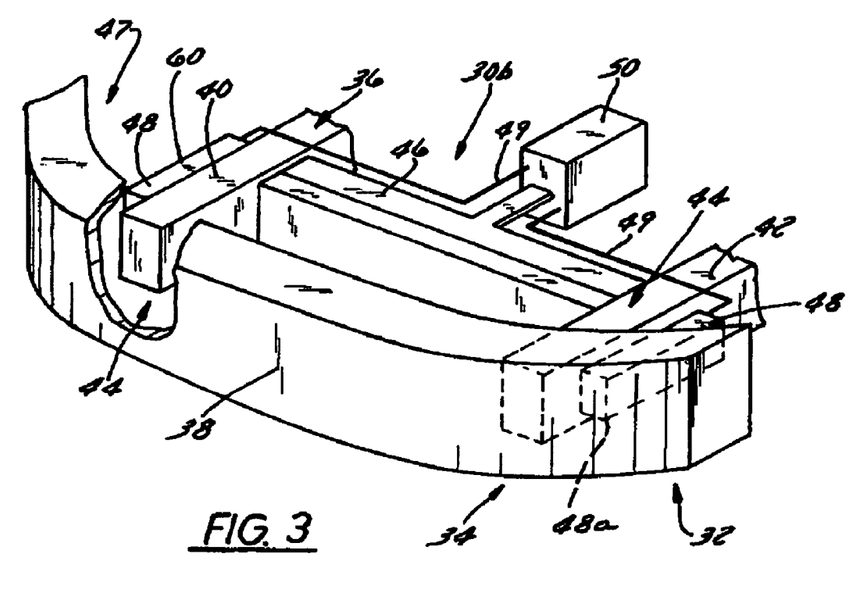
FIG. 3 is a perspective fragmentary view of a portion of the front end of an exemplary motor vehicle having a second embodiment of an impact sensing system according to the present invention.

FIG. 3 illustrates a second preferred embodiment of impact sensing system 30b where each deformable vessel pressure sensor assembly 48 is mounted to a portion of the vehicle frame 36 spaced a distance away from bumper 38 but still within the crush zone 47. For example, as is shown in FIG. 3, each sensor assembly 48 is disposed along an outboard side of a corresponding one of the frame rails 40, 42. It is contemplated that each sensor assembly 48 is mounted to frame rail 40, 42, but can be attached to another component in a manner that positions sensor assembly 48 outboard of frame rails 40, 42. Of course, while the sensor assemblies 48 are shown in FIG. 3 positioned outboard of frame rails 40, 42, they can be positioned inboard or located in a different position relative to frame rails 40, 42.

Instead of or in addition to the aforementioned front crush zone placement, one or more deformable vessel pressure sensor assemblies 48 can be placed in one or more or all of the door compartments (not shown) of the vehicle 34 for use in side impact sensing applications. One or more such sensor assemblies 48 can also be placed in a rear end area of the vehicle 34, including in any rear crush zone (not shown) of the vehicle for use in rear impact sensing applications.

By mounting the deformable vessel pressure sensor assemblies 48 in the crush zone 47 in the exemplary but preferred impact sensing systems 30a and 30b shown in FIGS. 1-3, each sensor assembly 48 is able deform due to crush in crush zone 47 occurring during impact thereby providing a signal to the controller 50 indicative of a rapid rise in pressure during the earliest stage of the impact. This enables the controller 50 to be alerted to an impact event very early during the event thereby optimizing the ability of the controller 50 to be able to make an early and accurate safety measure deployment decision. For example, in an impact that deforms crush zone 47, signals from one or both sensor assemblies 48 that are indicative of a rapid rise in pressure in the sensor assembly 48 puts the controller 50 on early notice of occurrence of a crash event that has a high likelihood of requiring safety measure deployment.

In this regard, such an occurrence advantageously can be used by the controller 50 to reduce the overall threshold used to deploy safety measures. For example, where a rapid rise in pressure or pressure spike in one or both pressure sensor assemblies 48 occurs, the controller 50 immediately lowers the threshold used in monitoring signals from other crash sensors, such as the centrally located accelerometers, in determining whether to trigger safety measure deployment.

Each deformable vessel pressure sensor assembly 48 is used to detect a change in the relative position of bumper 38 relative to frame 36 due to deformation in the crush zone 47 during an impact by the controller 50 monitoring a pressure change resulting from this displacement or deformation in assessing whether the change is the result of an impact that requires safety measure deployment or whether the sensor information is indicative of an event that does not require safety measure deployment. Where no deformation of the sensor assembly occurs or where the rise in pressure is not great enough or rapid enough, the controller 50 will tend not to deploy safety measures. However, a relatively large or rapid pressure change over a relatively short time period, typically measured in milliseconds, is indicative of an impact event requiring safety measure deployment, whereas no detected pressure changes or relatively smaller detected changes over the same time period is either indicative that no impact occurred or was an impact that does not require safety measure deployment. Where the rise in pressure is great enough or rapid enough over a relatively short period time, additional correlation is required from other crash sensors for the controller 50 to deploy safety measures. In other words, in the currently preferred implementation of impact sensing system operation, a rapid or large pressure rise detected by one or both sensor assemblies 48 alone will not cause controller 50 to deploy safety measures.

It is appreciated that controller 50 may initiate any of a variety of safety measures. Examples of impact safety measures include deployment of one or more air bags, fixing the position of or slightly retracting an occupant restraint interference with driver-commanded operation of the engine or drive train of the vehicle, and/or altering the braking and/or suspension performance of the vehicle in response to an impact event that would require deployment of one or more of these safety measures. It is further appreciated that controller 50 can be programmed with a pressure increase threshold associated with an impact severity. Impacts that satisfy the threshold would instigate certain safety measure activities; whereas impacts that fail to satisfy the threshold would enable only other or even no safety measures. Understandably, controller 50 can be configured such that, if the exact value of the pressure increase threshold is achieved, safety measures can be deployed or enabled if so desired.

Figure 4:
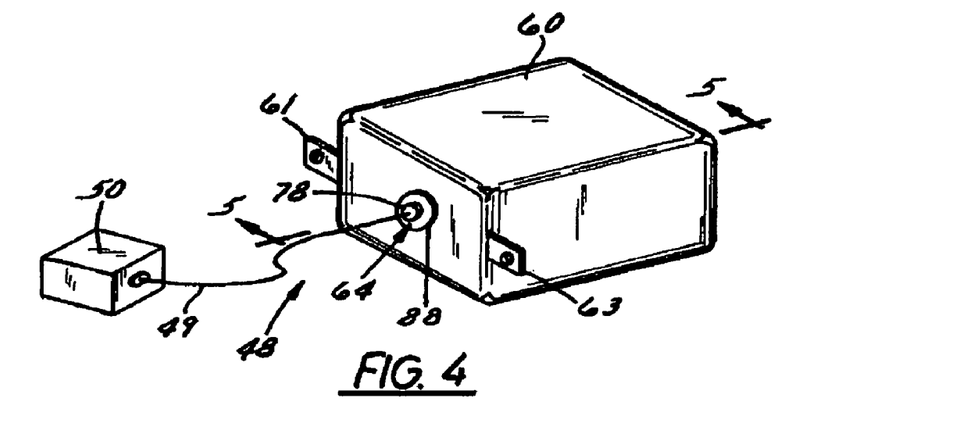
FIG. 4 is a perspective view of the impact sensor assembly used in the impact systems of FIGS. 1 and 2 removed from the vehicle depicting an exemplary embodiment of a pressure sensor positioned in a side thereof.
Figure 5:
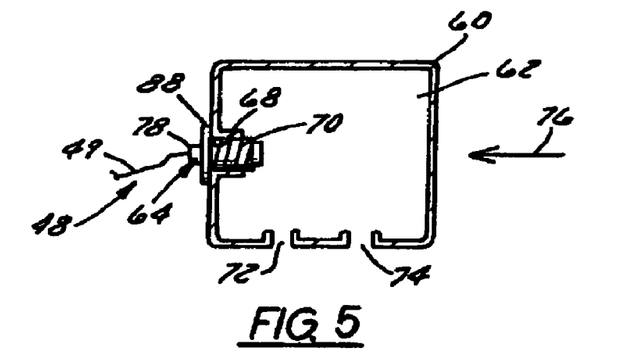
FIG. 5 is a cross-sectional view of the impact sensor assembly, taken along line 5-5 of FIG. 4.

Referring to FIGS. 4 and 5, deformable vessel pressure sensor assembly 48 includes a deformable pressure vessel 60 that encloses a cavity or volume 62 (FIG. 4). It is contemplated that the cavity or volume 62 holds air or another suitable gas at a relatively low pressure, such as ambient pressure. A pressure sensor 64 is operatively connected to deformable vessel 60 so as to monitor a pressure of air or other gas within the volume 62 of the vessel 60. As discussed above, a digital bus 49 links the sensor 64 to controller 50 for communicating sensor signal information to the controller 50.

A variety of pressure sensors are suitable for use with the deformable vessel 60, so long as they have a fast enough response time. A fast acting pressure sensor, such as a commercially available side crash pressure sensor that can be of piezoelectric or capacitive pressure sensor construction, is an example of a pressure sensor that is well suited for use as pressure sensor 64 for outputting pressure signals fast enough so as to enable the controller 50 to detect rapid deformable vessel pressure changes fast enough to more accurately make deployment decisions. Such a pressure sensor 64 can include an integrated A/D converter along with one or more ASICs capable of processing sensor signals upstream of the controller 50, such as by filtering, integrating, or otherwise processing them and can be parasitically powered by the bus 49. If desired, although not shown in the drawings, an accelerometer can be integrated into pressure sensor 64 with signals from the accelerometer communicated to the controller 50 over a digital bus in a known manner.

Since a typical crash event occurs very rapidly, an impact sensing system 30a or 30b that employs a controller 50 capable of detecting rapid pressure changes that occur during this time frame by the pressure sensor 64 providing signals indicative of pressure in the deformable vessel 60 on the order of every 100 microseconds or so such that it is capable of providing useful pressure change information early enough during an event to distinguish between a crash event requiring safety measure deployment and an event not requiring deployment. Unlike the conventional case where an accelerometer is attached to a beam, frame rail, or some other part of the car frame, the force from a crash even need not act along any particular axis of the deformable vessel pressure sensor assembly 48, including pressure sensor 64, to be accurately detected. Instead, it need only compress deformable vessel 60 sufficiently fast to produce a rapid enough pressure change inside the vessel 60 that still can be detected using the pressure sensor 64 and assessed as one resulting from a crash.

As shown in FIG. 5, deformable pressure vessel 60 includes an opening 68 that cooperates with pressure sensor 64 in a sealed manner. Preferably, opening 68 is threaded so as to cooperate with a threaded surface 70 formed on pressure sensor 64. Understandably, pressure sensor 64 can be configured to cooperate with vessel 60 in any number of ways including a snap-fit connection or other deformable tab connection.

Deformable pressure vessel 60 is formed of any suitable deformable material and as discussed above can be formed in any number of suitable shapes. In one preferred embodiment, deformable pressure vessel 60 is formed of a moldable material, such as plastic, using a molding process, such as a plastic injection or blow molding process.

Vessel 60 may include one or more vents 72, 74 that allow non-rupturing deformation of pressure vessel 60 in response to a relative displacement, indicated by arrow 76 (FIG. 4), of one of frame 36 or bumper 38 and resultant compression of vessel 60 that occurs during a crash event. Such vents 72, 74 also help normalize vessel pressure to that of ambient prior to occurrence of any impact or other crash event. Although cavity 62 is vented to atmosphere, vents 72, 74 are sized and shaped to allow some degree of pressurization of cavity 62 when subjected to a force or load 76 and a resultant pressure increase that is detectable by the sensor 64 as being indicative of a crash event when the rate of movement of the bumper 38 relative to the frame member 36 is sufficiently high. For example, in a preferred embodiment, vents 72, 74 are configured, such as by varying the size of each vent, to tune the pressure venting characteristics of vessel 60 so it provides the desired early rapid increase in pressure within vessel 60 during an impact. Routine testing and experimentation is used to determine the size, shape and venting characteristics based on the crush zone and other crash related characteristics of vehicle 34 in which pressure sensor assemblies 48 using vessels 60 are used.

Figure 6:
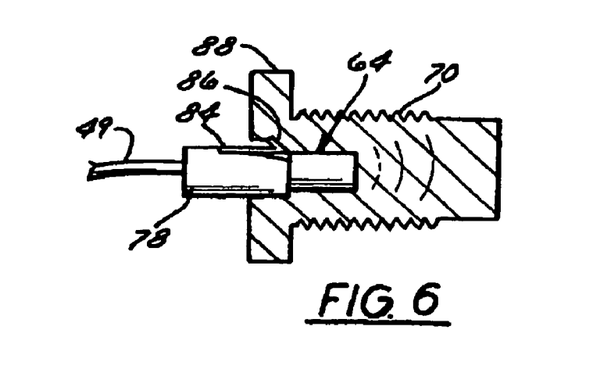
FIG. 6 is a cross-sectional view of the pressure sensor shown in FIG. 4.

As shown in FIG. 6, in a preferred embodiment, pressure sensor 64 cooperates with a sealed connector 78 that is attachable to bus 49 that links sensor 64 to controller 50. Connector 78 includes a tab 84 having a projection 86 that cooperates with a body 88 of pressure sensor 64. Deflection of tab 84 allows connector 78 to be disengaged from body 88 of pressure sensor 64 to facilitate more convenient servicing of pressure sensor 64 and/or deformable vessel 60. Understandably, the present invention is equally applicable with other pressure monitoring systems, such as that disclosed in U.S. Pat. No. 6,182,514. As disclosed therein, pressure sensor 64 may alternatively be configured to monitor magnetic characteristics around the vessel in assessing the relative position and rates of positional change of structure adjacent the sensor.

As shown in FIG. 3, pressure vessel 60 can include one or more tabs 61, 63 that facilitate mounting of deformable pressure vessel 60 on vehicle 34. Tabs 61, 63 could be provided in virtually any number and shape. It is further envisioned that tabs 61, 63 be configured to cooperate with adjacent structure of vehicle 34 such that no additional fasteners would be required for connecting pressure vessel 60 to vehicle 34.

Together the deformable vessel 60 and pressure sensor 64 form a deformable vessel pressure sensor assembly 48 that can be and preferably is of modular construction. Such a sensor assembly 48 can advantageously also be configured to be of plug-and-play construction.

Regardless of the specific construction of sensor 64, in addition to the information communicated to controller 50 from sensor 64, controller 50 may, if desired, be configured to receive information from a number of vehicle systems including engine and drive train systems, suspension and braking systems, occupant restraint and airbag systems, and one or more accelerometers such as those disclosed in U.S. Pat. No. 7,207,410. Such accelerometers can be located within controller 50 or in another location remote from either controller 50 or sensor assemblies 48.

During operation of motor vehicle 34, deformable vessel pressure sensor assemblies 48 communicate pressure change information associated with deformable pressure vessels 60 to controller 50. The information provided to controller 50 from sensor assemblies 48 is utilized by the controller 50 to determine if deployment of a safety measure is warranted. If, in conjunction with a pressure increase in a short period (indicative of aggressive or rapid deformation of vessel 60), controller 50 also receives a signal indicative of a high acceleration from an acceleration monitoring system, controller 50 initiates safety measures, such as those described above, as such information is indicative of a threshold value being exceeded. Comparatively, if controller 50 receives information indicative of high acceleration with a low or no rate of pressure change associated with deformable pressure vessel 60, the decision of whether to deploy safety measures can be deferred by the controller based on operating condition information other than and/or in addition to the rate of pressure change associated with vessel 60.

During low speed events with a low or no pressure rate change condition, controller 50 would default to a no-deployment condition. If low speed is detected in combination with a high pressure rate change signal from sensor 64, such an event can also result in a no-deployment condition as being related to a localized impact event or an event for which no safety measures are available or beneficial. During mid-velocity events, or events at speeds over parking or coasting speeds but below common travel speeds, controller 50 operates in an enhanced deployment condition during periods associated with high pressure rate changes of vessel 60. During this enhanced deployment operating condition, controller 50 may initiate safety measures only after intermediary threshold values are satisfied or upon consideration of additional information such as the relative location of the effected pressure sensor(s), the operating condition of the vehicle or vehicle systems, etc.

Impact sensing system 30*a* or 30*b*, in monitoring both changes in pressure and the relative rates of such pressure changes, provides an impact detecting system that can quickly and efficiently assess the necessity and effectiveness of employing a variety of safety measures in response to detected impact events. System 30*a* or 30*b* can accurately and rapidly determine when and which safety measures should be deployed during impact events so as to provide a vehicle with enhanced impact counteraction performance.

If desired, the controller can also receive information regarding the availability of the safety measures and to disregard certain sensed pressure changes associated with impact events if the safety measure that would otherwise be deployed in response to that impact event is unavailable. For instance, if a pressure change of a given magnitude would normally trigger activation of an airbag, the controller 50 could disregard a sensed pressure change of that magnitude if the airbag is unavailable.

The present invention has been described in terms of the preferred embodiment, and it is recognized that equivalents, alternatives, and modifications, aside from those expressly stated, are possible and within the scope of the appended claims. It is further appreciated that the respective features of any one of the embodiments discussed above is not necessarily solely exclusive thereto.

What is claimed is:

1. An impact sensing system for a motor vehicle comprising:
    a deformable vessel enclosing a volume that deforms during an impact event, the deformable vessel comprising at least one vent normalizing the pressure of the vessel with ambient prior to an impact event and tuning pressure venting characteristics of the deformable vessel during the impact event, the deformable vessel located between first and second portions of the motor vehicle, and the deformable vessel controllably vented during deformation during an impact event producing non-rupturing deformation of the deformable vessel during the impact event;
    a pressure sensor operatively connected to the deformable vessel that outputs a signal indicative of a pressure of air or gas in the volume enclosed by the deformable vessel;
    an acceleration detector; and
    a controller configured to (a) receive a signal from the acceleration detector, (b) receive a signal from the pressure sensor and determine a rate of change in relative position of the first portion of the motor vehicle relative to the second portion of the motor vehicle based on a rate of change of a pressure of air or gas in the deformable vessel, and (c) lower a threshold in the signal from the acceleration detector used in determining whether to deploy an airbag, perform engine control, perform drivetrain control, alter suspension performance, or alter steering performance based on the rate of change of pressure in the deformable vessel when the pressure in the deformable vessel increases during an impact event.

2. The system of claim 1 wherein the controller is configured to differentiate between impact and non-impact events.

3. The system of claim 2 wherein the controller detects a threshold pressure change such that values above the threshold pressure change are associated with impact events and deploy the airbag, perform engine control, perform drivetrain control, alter suspension performance, or alter steering performance and values below the threshold pressure change are associated with non-impact events and do not deploy the airbag, perform engine control, perform drivetrain control, alter suspension performance, nor alter steering performance.

4. The system of claim 3 wherein the controller is configured with a threshold pressure change associated with impact severity.

5. The system of claim 1 wherein the deformable vessel has a plurality of vents formed therein configured to produce non-rupturing deformation of the deformable vessel during an impact event.

6. The system of claim 1 wherein the first portion of the motor vehicle is one of a bumper and a longitudinally extending elongate frame rail and the second portion of the motor vehicle is the other one of the bumper and the longitudinally extending frame rail.

7. The system of claim 6 wherein the deformable vessel is mounted to an end of the frame rail locating the deformable vessel between the end of the frame rail and the bumper.

8. The system of claim 7 wherein the pressure sensor comprises an integrated accelerometer.

9. The system of claim 1 wherein the first portion of the motor vehicle comprises a bumper and the second portion of the motor vehicle comprises one of a pair of spaced apart longitudinally extending frame rails having one end that attaches the deformable vessel and pressure sensor operatively connected to the deformable vessel and further comprising a second deformable vessel attached to one end of the other one of the pair of spaced apart longitudinally extending frame rails and second pressure sensor operatively connected to the second deformable vessel at a location remote from the first deformable vessel and pressure sensor.

10. A vehicle comprising:
   a vessel located between a bumper and a longitudinally extending frame rail of the vehicle, the vessel mounted to the frame rail and shaped such that altering a shape of the vessel changes a pressure associated therewith, and the vessel controllably vented during deformation during an impact event producing non-rupturing deformation of the vessel during the impact event;
   a pressure sensor attached to the vessel that outputs a signal indicative of a pressure of air or gas in the vessel;
   an accelerometer; and
   a controller connected to the vehicle and configured to (a) receive a signal from the pressure sensor indicative of the air or gas pressure of the vessel, (b) receive a signal from the accelerometer indicative of vehicle acceleration, (c) monitor changes in vessel pressure and relative rates of vessel pressure changes, and (d) deploy an airbag, apply brakes, cause restraint interaction, alter engine performance, alter drive train performance, or alter suspension performance when a signal indicative of a high vessel pressure is received while a signal indicative of a high acceleration is received.

11. The vehicle of claim 10 wherein the controller is further configured to determine a rate of change of the air or gas pressure of the vessel.

12. The vehicle of claim 11 wherein the controller utilizes the rate of pressure change to differentiate between events requiring deployment of an airbag, application of brakes, restraint interaction, alteration of engine performance, alteration of drive train performance, or alteration of suspension performance and events not requiring deployment of an airbag, application of brakes, restraint interaction, alteration of engine performance, alteration of drive train performance, or alteration of suspension performance by lowering a threshold of the signal indicative of vehicle acceleration when a signal indicative of a high rate of pressure change is received by the controller.

13. The vehicle of claim 10 wherein the vessel comprises a deformable container and the pressure sensor comprises an integrated accelerometer.

14. The vehicle of claim 13 wherein the deformable container is replaceable.

15. The vehicle of claim 10 further comprising a digital bus linking the pressure sensor to the controller.

16. The vehicle of claim 10 wherein the vessel has a plurality of vents formed therein configured to produce non-rupturing deformation of the vessel during an impact event.

17. The vehicle of claim 10 wherein the vessel and the pressure sensor comprise a deformable vessel pressure sensor assembly of modular construction having the pressure sensor mounted to the vessel and the vessel mounted to an end of the frame rail.

* * * * *